United States Patent
Tzelepis et al.

(10) Patent No.: US 9,980,300 B2
(45) Date of Patent: May 22, 2018

(54) WEARABLES MAKING A LINK TO COMMUNICATION SYSTEMS

(71) Applicant: THE BOEING COMPANY, Chicago, IL (US)

(72) Inventors: Christ P. Tzelepis, Chicago, IL (US); David A. Whelan, Chicago, IL (US)

(73) Assignee: The Boeing Company, Chicago, IL (US)

( * ) Notice: Subject to any disclaimer, the term of this patent is extended or adjusted under 35 U.S.C. 154(b) by 0 days. days.

(21) Appl. No.: 15/143,247

(22) Filed: Apr. 29, 2016

(65) Prior Publication Data

US 2017/0318610 A1 Nov. 2, 2017

(51) Int. Cl.
| | |
|---|---|
| *H04M 1/00* | (2006.01) |
| *H04W 76/02* | (2009.01) |
| *H04B 1/3827* | (2015.01) |
| *H04B 7/185* | (2006.01) |

(52) U.S. Cl.
CPC .......... *H04W 76/02* (2013.01); *H04B 1/385* (2013.01); *H04B 7/1858* (2013.01)

(58) Field of Classification Search
CPC .................. H04W 76/02; H04B 1/385; H04B 2001/3872; H04B 7/0617
See application file for complete search history.

(56) References Cited

U.S. PATENT DOCUMENTS

| | | | | |
|---|---|---|---|---|
| 4,425,567 A | * | 1/1984 | Tresselt | ................ H01Q 25/02 342/373 |
| 7,020,463 B2 | | 3/2006 | Bybee et al. | |
| 2014/0374616 A1 | * | 12/2014 | Larussi | ..................... H01P 5/10 250/394 |
| 2015/0188622 A1 | * | 7/2015 | Leabman | ............... H01Q 1/246 370/316 |
| 2015/0249916 A1 | * | 9/2015 | Schlub | ................... H01Q 1/243 455/419 |
| 2016/0063232 A1 | * | 3/2016 | Seol | ..................... G06F 3/03547 726/19 |
| 2016/0087349 A1 | * | 3/2016 | Lee | ........................ H01Q 1/246 342/373 |

OTHER PUBLICATIONS

Pro Trek Satellite Navi, Wrist Networks, Casio, available at: http://www.casiojv.com/gps/satellite.htm, available on Nov. 13, 2015.

* cited by examiner

*Primary Examiner* — Tuan Pham
(74) *Attorney, Agent, or Firm* — Haynes and Boone, LLP

(57) ABSTRACT

Systems, methods, and apparatus for a wearable device to make a link with a communication system are disclosed. In one or more embodiments, a disclosed method for a wearable device to make a link with a communication system comprises transmitting, by the communication system, at least one first signal. The method further comprises receiving, by each of at least two antennas of the wearable device, at least one first signal from the communication system. In one or more embodiments, each of at least two antennas is adaptively excited to steer in a direction towards the communication system and/or steer in a direction to null at least one interferer. Also, the method involves transmitting, by each of at least two antennas of the wearable device, at least one second signal towards the communication system. Further, the method involves receiving, by the communication system, at least one second signal.

19 Claims, 4 Drawing Sheets

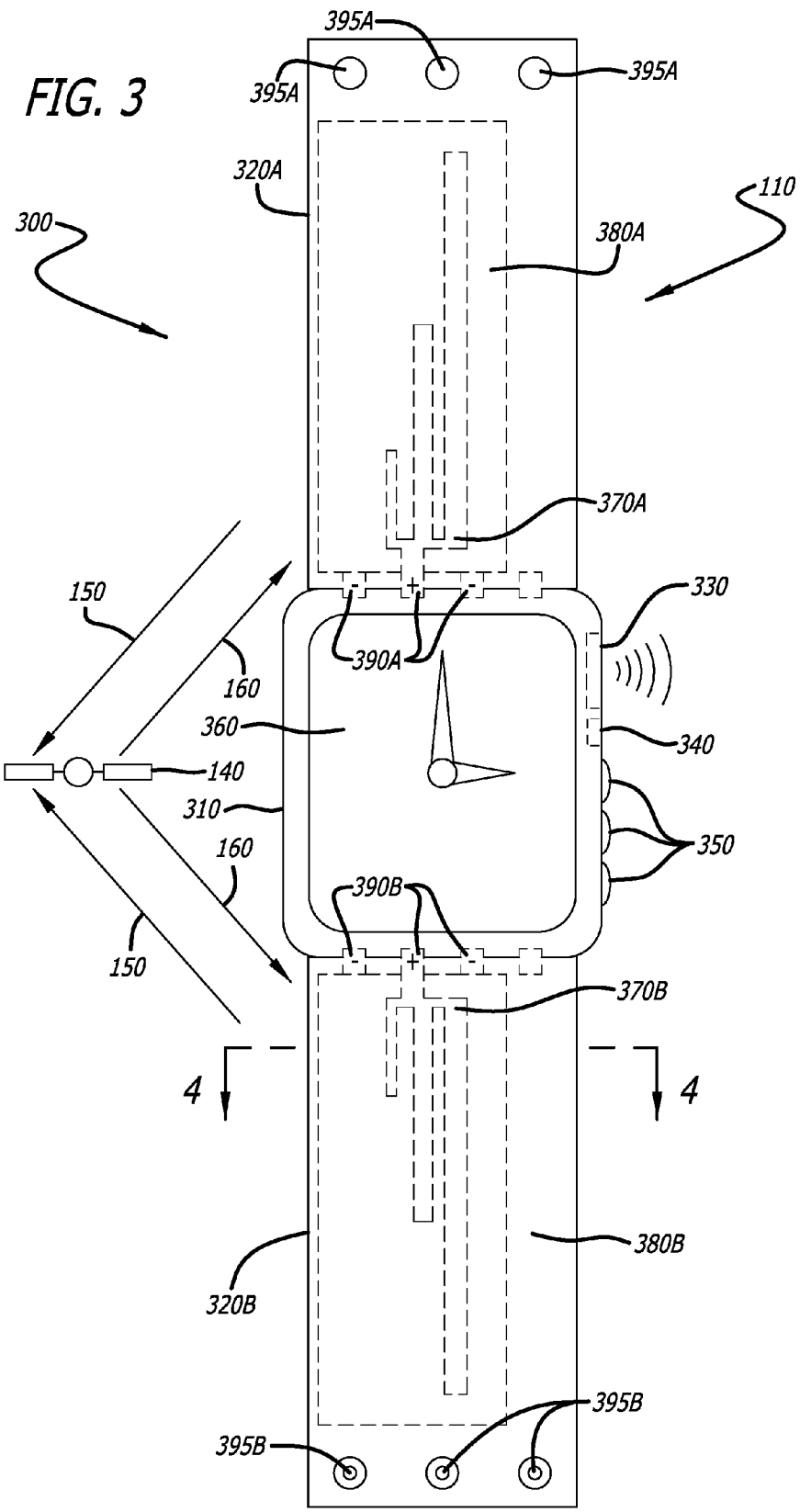

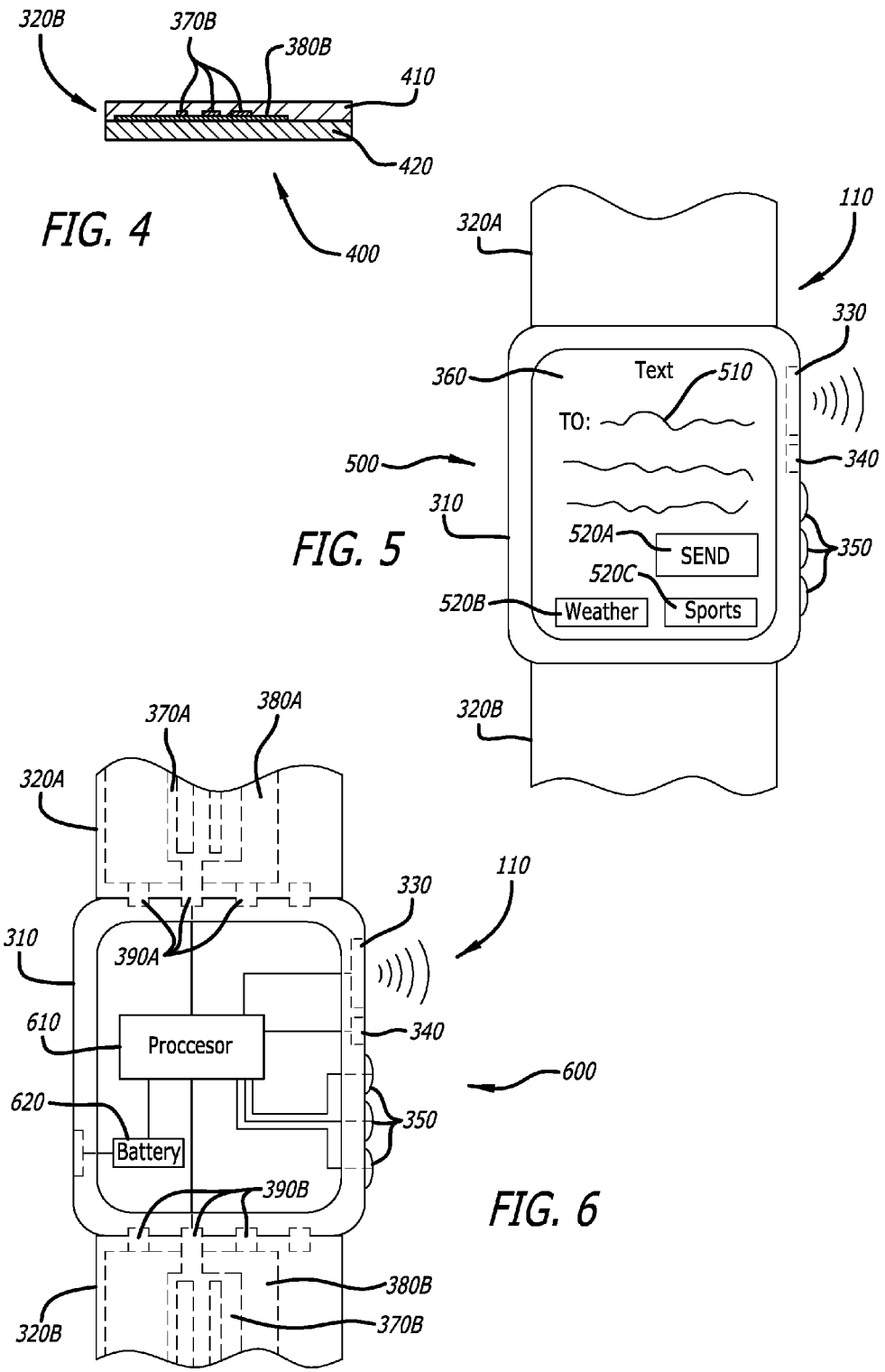

WEARABLES MAKING A LINK TO COMMUNICATION SYSTEMS

FIELD

The present disclosure relates to wearables. In particular, it relates to wearables making a link to communication systems.

BACKGROUND

Current wearable technology is limited in its application to tethering to devices within a limited range. Existing solutions tether (e.g., wirelessly) wearables (e.g., smart watches) to associated devices (e.g., smart phones and/or electronic pads (Epads)). These wearables operate at a limited distance from the tethered device, which is typically only within a few meters. This limitation is due to the antenna performance and digital processing employed by the wearables. As such, there is need for an improved wearable technology that increases the usable range to various communication systems.

SUMMARY

The present disclosure relates to a method, system, and apparatus for conformal load bearing distributed sensing arrays. In one or more embodiments, a method for a wearable device to make a link with a communication system comprises transmitting, by the communication system, at least one first signal. The method further involves receiving, by each of at least two antennas of the wearable device, at least one first signal from the communication system. In one or more embodiments, each of at least two antennas is adaptively excited to steer in a direction towards the communication system and/or steer in a direction to null at least one interferer.

In one or more embodiments, the method further comprises transmitting, by each of at least two antennas of the wearable device, at least one second signal towards the communication system. Also, the method comprises receiving, by the communication system, at least one second signal.

In at least one embodiment, each of at least two antennas is adaptively excited via differential inputs.

In one or more embodiments, the communication system comprises at least one vehicle and/or at least one cellular tower. In some embodiments, at least one vehicle is at least one satellite, at least one an airborne vehicle, at least one terrestrial vehicle, and/or at least one marine vehicle.

In at least one embodiment, the wearable device comprises two bands, and each of the bands comprises at least one of at least two antennas. In some embodiments, at least one of at least two antennas is embedded within each of the bands. In one or more embodiments, at least one ground plane is embedded within each of the bands.

In one or more embodiments, at least two antennas are radio frequency (RF) antennas.

In at least one embodiment, the wearable device comprises at least one display. In some embodiments, at least one display displays text and/or images.

In one or more embodiments, the wearable device comprises at least one speaker and/or at least one microphone.

In at least one embodiment, at least one of at least two antennas is a planar log periodic antenna.

In one or more embodiments, a system for a wearable device to make a link with a communication system comprises the communication system to transmit at least one first signal. The system further comprises at least two antennas of the wearable device. In at least one embodiment, each of at least two antennas of the wearable device is to receive at least one first signal from the communication system. In some embodiments, each of at least two antennas is adaptively excited to steer in a direction towards the communication system and/or steer in a direction to null at least one interferer.

In at least one embodiment, each of at least two antennas of the wearable device is further to transmit at least one second signal towards the communication system. In some embodiments, the communication system is further to receive the at least one second signal.

In one or more embodiments, a wearable device to make a link with a communication system comprises at least two antennas. In at least one embodiment, each of at least two antennas is to receive at least one first signal from the communication system. In some embodiments, each of at least two antennas is adaptively excited to steer in a direction towards the communication system and/or steer in a direction to null at least one interferer. In one or more embodiments, each of at least two antennas is further to transmit at least one second signal towards the communication system.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 3 is a diagram depicting the disclosed wearable device to make a link with a communication system, in accordance with at least one embodiment of the present disclosure.

FIG. 4 is a diagram showing a cut-away side view of the band of the disclosed wearable device to make a link with a communication system of FIG. 3, in accordance with at least one embodiment of the present disclosure.

FIG. 5 is a diagram depicting exemplary details of the display of the watch of the disclosed wearable device to make a link with a communication system of FIG. 3, in accordance with at least one embodiment of the present disclosure.

FIG. 6 is a diagram illustrating a cut-away view of the watch of the disclosed wearable device to make a link with a communication system of FIG. 3, in accordance with at least one embodiment of the present disclosure.

DESCRIPTION

Figure 1:
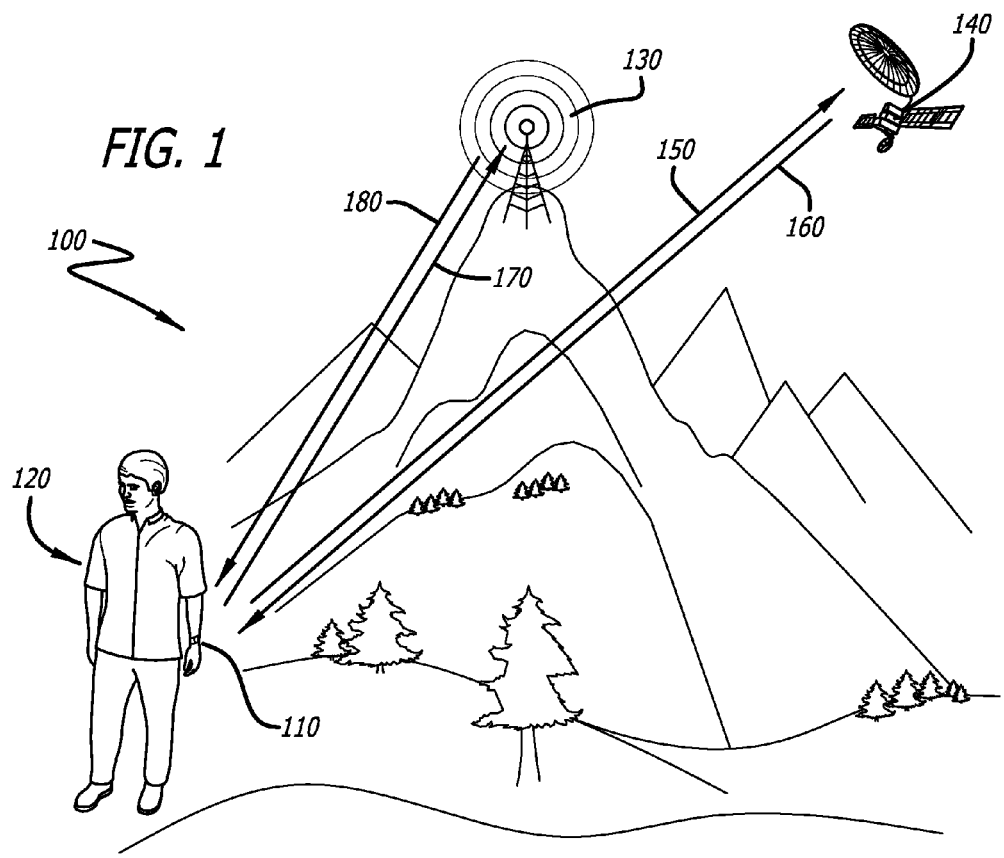
FIG. 1 is a diagram showing the disclosed system for a wearable device to make a link with a communication system (e.g., a satellite communication system and/or a cellular communication system), in accordance with at least one embodiment of the present disclosure.

The methods and apparatus disclosed herein provide an operative system for a wearable device to make a link with a communication system. The system of the present disclosure teaches a wearable device (e.g., a smart watch) that employs multiple wideband antennas and adaptive beam-forming to enable the wearable device to directly communicate with communication systems (e.g., satellite communication systems). The disclosed system allows for the wearable device to interface directly with communication systems without the need to be tethered (e.g., wirelessly) to an associated device (e.g., a smart phone and/or an electronic pad (Epad)).

As previously mentioned above, current wearable technology is limited in its application to tethering to devices within a limited range. Existing solutions tether (e.g., wirelessly) wearables (e.g., smart watches) to associated devices (e.g., smart phones and/or Epads). These wearables operate at a limited distance from the tethered device, which is typically only within a few meters. This limitation is due to the antenna performance and digital processing employed by the wearables.

The disclosed system provides a solution that increases the usage range of wearable technology to include space-based communication systems. The disclosed system employs multiple wideband antennas and adaptive beam forming within the disclosed wearable device to enable connectivity to various communication systems, including space-based communication systems. The antennas are embedded in the wrist strap (i.e. band) of the wearable technology (e.g., smart watch). Differential outputs on the watch are used to excite the radio frequency (RF) feeds of the antennas. Adaptive beam forming is used to maximize reception of the signals from the communication systems. The adaptive beam forming occurs within the digital processing/modem (e.g., at least one processor) within the watch.

The disclosed system for a wearable device to make a link with a communication system has three main features. The first feature of the disclosed system is that the wearable device uses satellite links to adaptively beam form the two wideband radiating antenna apertures. With this capability, the wearable device is able to receive a satellite beam (i.e. satellite signal) in any direction to maximize the gain in the direction of strongest signal and/or, if needed, to actively place nulls on interferers.

The second feature of the disclosed system is that the wearable device has a data rate capability (e.g., kilobits per second (Kbps)) to be able to receive and/or transmit image data, voice data, and/or textual data from/to a satellite communication system. For example, a limiting case for the disclosed system employs a geo-mobile satellite(s) in geo-synchronous earth orbit (GEO) with a 22 meter (m) antenna aperture at S-Band frequencies with a 10 degree (10°) degree lookup, and assumes a 1.7 decibel (dB) energy per bit to noise power spectral density ratio (Eb/NO) ½ rate low-density parity-check (LDPC). For this case, the wearable device has a data rate capability of approximately 128 Kbps along with 20 decibel-milliwatts (dBm) of transmit power.

The third feature of the disclosed system is that the wearable device employs at least one wide band antenna embedded within each of its bands. In one or more embodiments, the antennas are planar log periodic antennas, which have very large bandwidths. It should be noted that in other embodiments, different types of wide band antennas, other than planar log periodic antennas, may be employed by the disclosed wearable device for the antennas embedded within the bands.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to wearable devices, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1 is a diagram 100 showing the disclosed system for a wearable device 110 to make a link with a communication system (e.g., a satellite communication system and/or a cellular communication system), in accordance with at least one embodiment of the present disclosure. In this figure, a civilian user 120 is shown to be wearing a wearable device 110, which is in the form of a watch, on his wrist. In addition, the wearable device 110 is shown to be communicating to two different communication systems (i.e. a cellular communication system, which is shown to employ a cellular tower 130, and a satellite communication, which is shown to employ a satellite 140).

During operation of the wearable device 110 making a link to the satellite communication system, a satellite 140 of the satellite communication system transmits at least one first signal 160 (e.g., a communication signal containing data related to text, voice, and/or images) to the wearable device 110. Antennas (not shown in FIG. 1) embedded within the wearable device 110 receive at least one first signal 160 from the satellite 140 of the satellite communication system. Additionally, the antennas embedded within the wearable device 110 transmit at least one second signal 150 (e.g., a communication signal containing data related to text, voice, and/or images) towards the satellite 140 of the satellite communication system. The satellite 140 of the satellite communication system receives at least one second signal 150 from the wearable device 110.

It should be noted that in one or more embodiments, various different types of satellites may be employed for the satellite 140 of the satellite communication system including, but not limited to, a low earth orbiting (LEO) satellite, a medium earth orbiting (MEO) satellite, a highly elliptical orbit (HEO) satellite, and a geosynchronous earth orbiting (GEO) satellite. Additionally, it should be noted that the satellite communication system may comprise more than one satellite 140 as is shown in FIG. 1.

During operation of the wearable device 110 making a link to the cellular communication system, a cellular tower 130 of the cellular communication system transmits at least one first signal 180 (e.g., a communication signal containing data related to text, voice, and/or images) to the wearable device 110. Antennas (not shown in FIG. 1) embedded within the wearable device 110 receive at least one first signal 180 from the cellular tower 130 of the cellular communication system. Additionally, the antennas embedded within the wearable device 110 transmit at least one second signal 170 (e.g., a communication signal containing data related to text, voice, and/or images) towards the cellular tower 130 of the cellular communication system. The cellular tower 130 of the cellular communication system receives at least one second signal 170 from the wearable device 110.

It should be noted that in one or more embodiments, the cellular communication system may comprise more than one cellular tower 130 as is shown in FIG. 1.

Figure 2:
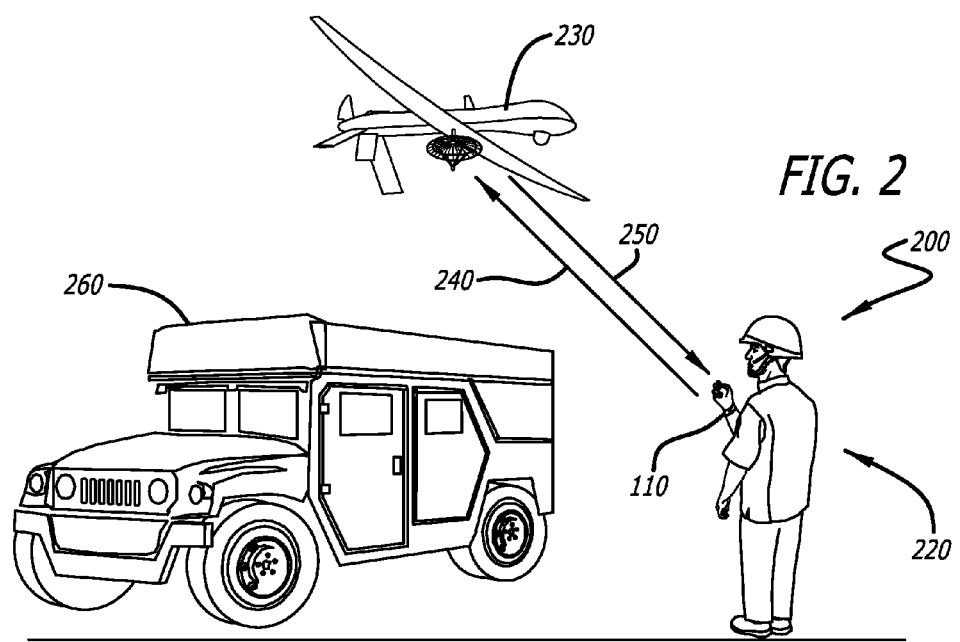
FIG. 2 is a diagram illustrating the disclosed system for a wearable device to make a link with a communication system (e.g., a military communication system), in accordance with at least one embodiment of the present disclosure.

FIG. 2 is a diagram 200 illustrating the disclosed system for a wearable device 110 to make a link with a communication system (e.g., a military communication system), in accordance with at least one embodiment of the present disclosure. In this figure, a military user 220 is shown to be standing outside of his military vehicle 260. The military user 220 is also shown to be wearing a wearable device 110, which is in the form of a watch, on his wrist. In addition, the wearable device 110 is shown to be communicating to a communication system (i.e. a military communication system, which is shown to employ a military aircraft 230).

During operation of the wearable device 110 making a link to the military communication system, a military aircraft 230 of the military communication system transmits at least one first signal 250 (e.g., a communication signal containing data related to text, voice, and/or images) to the wearable device 110. Antennas (not shown in FIG. 2) embedded within the wearable device 110 receive at least one first signal 250 from the military aircraft 230 of the military communication system. Additionally, the antennas embedded within the wearable device 110 transmit at least one second signal 240 (e.g., a communication signal containing data related to text, voice, and/or images) towards the military aircraft 230 of the military communication system. The military aircraft 230 of the military communication system receives at least one second signal 240 from the wearable device 110.

It should be noted that in one or more embodiments, various different types of vehicles may be employed for the military aircraft 230 of the military communication system including, but not limited to, various different types of airborne vehicles (e.g., aircraft and unmanned aerial vehicles (UAVs)), various different types of terrestrial vehicles (e.g., tanks), and various different types of marine vehicles (e.g., ships). Additionally, it should be noted that the military communication system may comprise more than one vehicle (e.g., military aircraft 230) as is shown in FIG. 2.

In addition, it should be noted that various different types of communication systems may be employed for the disclosed communication system including, but not limited to, satellite communication systems, military communication systems, cellular communication systems, civilian communication systems, private communication systems, and government communication systems. It should be noted that in at least one embodiment, various different types of vehicles may be employed for the disclosed communication system including, but not limited to, various different types of satellites (e.g., LEO satellites, MEO satellite, HEO satellites, and GEO satellites), various different types of airborne vehicles (e.g., aircraft and UAVs), various different types of terrestrial vehicles (e.g., tanks), and various different types of marine vehicles (e.g., ships).

FIG. 3 is a diagram 300 depicting the disclosed wearable device 110 to make a link with a communication system, in accordance with at least one embodiment of the present disclosure. In this figure, the wearable device 110 is shown to comprise a watch 310 and two bands 320A, 320B. The watch 310 is shown to comprise a display 360, a speaker 330, a microphone 340, and a plurality of control buttons 350. The display 360 is used to display 360 a variety of content to the user 120 including, but not limited to, text and images. In FIG. 3, the display 360 is shown to be displaying the time. The speaker 330 is used to generate sounds and voice to be heard by the user 120. The microphone 340 is used to record voice from the user 120 and sounds. The control buttons 350 allow for the user 120 to control and/or program the watch 310. It should be noted that in one or more embodiments, the watch 310 may comprise more or less displays 360, speakers 330, microphones 340, and/or control buttons 350 than is shown in FIG. 3.

Also shown in FIG. 3, each band 320A, 320B comprises a wide band antenna 370A, 370B. Each antenna 370A, 370B is a planar log periodic antenna. The antennas 370A, 370B are radio frequency (RF) antennas that may transmit and/or receive signals having a variety of different frequency bands including, but not limited to, S-band, C-band, L-band, X-band, Ku-band, and/or Ka-band. Each antenna 370A, 370B is shown to comprise three monopole antennas of different lengths, whereby each length is tuned to a different frequency band. It should be noted that in one or more embodiments, each antenna 370A, 370B, may comprise more or less monopole antennas than is shown in FIG. 3. In addition, it should be noted that in one or more embodiments, various different types of antennas may be employed for the antennas 370A, 370B of the disclosed wearable device 110 other than a plurality of monopole antennas as shown in FIG. 3 including, but not limited to, patch antennas. Also, it should be noted that in one or more embodiments, each band 320A, 320B may comprise more than one antenna 370A, 370B than is shown in FIG. 3.

Also shown in FIG. 3, each antenna 370A, 370B is mounted to a ground plane 380A, 380B. In addition, it should be noted that in one or more embodiments, each band 320A, 320B may comprise more than one ground plane 380A, 380B than is shown in FIG. 3.

Additionally shown in FIG. 3, the wearable device 110 comprises a plurality of differential inputs 390A, 390B connected to both the watch 310 and the bands 320A, 320B. The watch 310 provides voltages to the differential inputs 390A, 390B. The differential inputs 390A, 390B provide voltages to the antennas 370A, 370B to adaptively excite the antennas 370A, 370B to steer the antenna beams (e.g., transmit beam and/or receive beam of each antenna 370A, 370B) towards the communication system (e.g., towards the satellite 140) and/or to steer the antenna beams in a direction to null at least one interferer.

The antennas 370A, 370B, the ground plane 380A, 380B, and the differential inputs 390A, 390B are all embedded within each band 320A, 320B, respectively. Details of the embedding of these components into the bands 320A, 320B are shown in FIG. 4.

Additionally shown in FIG. 3, each band 320A, 320B comprises a plurality fasteners 395A, 395b, which are used to fasten the wearable device 110 onto the wrist of the user 120. It should be noted that in one or more embodiments, various different types of fasteners may be employed for the fasteners 395A, 395B of the disclosed wearable device including, but not limited to, snaps, Velcro, and buckles. In addition, it should be noted that in one or more embodiments, more or less fasteners 395A, 395B may be employed by the bands 320A, 320B of the disclosed wearable device 110 than is shown in FIG. 3.

FIG. 4 is a diagram 400 showing a cut-away side view of the band 320B of the disclosed wearable device 110 to make a link with a communication system of FIG. 3, in accordance with at least one embodiment of the present disclosure. In this figure, the band 320B is shown to comprise an outer layer 410 and an inner layer 420. The outer layer 410 and the inner layer 420 may be manufactured from various different types of materials including, but not limited to, various different types of insulator materials (e.g., polymer materials). The antenna 370B is shown to be mounted on top of the ground plane 380B. And, the antenna 370B and the ground plane 380B are shown to be embedded within and in between the outer layer 410 and the inner layer 420 of the band 320б.

FIG. 5 is a diagram 500 depicting exemplary details of the display 360 of the watch 310 of the disclosed wearable device 110 to make a link with a communication system of FIG. 3, in accordance with at least one embodiment of the present disclosure. In this figure, the display 360 is shown to be displaying various text, which happens to be in the form of a textual message 510. In addition, the display 360 is shown to be displaying a number of selection buttons 520A-C, including a "send" button 520A, a "weather" button 520B, and a "sports" button 520C. The text buttons 520A-C may be selected by the user 120 via the buttons 350 and/or by using the display 360, which may be a touch screen display in some embodiments. It should be noted that in one or more embodiments, various different types of buttons may be employed by the display 360 of the wearable device 110 other than the buttons 520A-C shown on the display 360 in FIG. 5. In addition, it should be noted that in one or more embodiments, more or less buttons may be employed by the display 360 than the buttons 520A-C shown in FIG. 5.

FIG. 6 is a diagram 600 illustrating a cut-away view of the watch 310 of the disclosed wearable device 110 to make a link with a communication system of FIG. 3, in accordance with at least one embodiment of the present disclosure. In this figure, the wearable device 110 is shown to comprise inside of the watch 310 a processor 610 and a battery 620. The processor 610 is shown to be connected to the battery 620, the differential inputs 390A, 390B, the speaker 330, the microphone 340, and the buttons 350. The battery 620 provides power to the processor 610. The processor 610 sends sound signals to the speaker 330. In addition, the processor 610 receives and processes signals it receives from the microphone 340 and the buttons 350. Additionally, the processor 610 sends signals (e.g., control voltages) to the differential inputs 390A, 390B to control the differential inputs 390A, 390B to provide voltages to the antennas 370A, 370B to adaptively excite the antennas 370A, 370B to steer the antenna beams (e.g., transmit beam and/or receive beam of each antenna 370A, 370B) towards the communication system (e.g., towards the satellite 140) and/or to steer the antenna beams in a direction to null at least one interferer. In one or more embodiments, the processor 610 runs a beam forming algorithm (or program) to determine how to steer the antennas 370A, 370B appropriately.

It should be noted that in one or more embodiments, the watch 310 of the wearable device 110 may comprise more or less components than as shown in FIG. 6. In addition, it should be noted that the watch 310 of the wearable device 110 may comprise more than one processor 610 and/or more than one battery 620 than as shown in FIG. 6.

Figure 7:
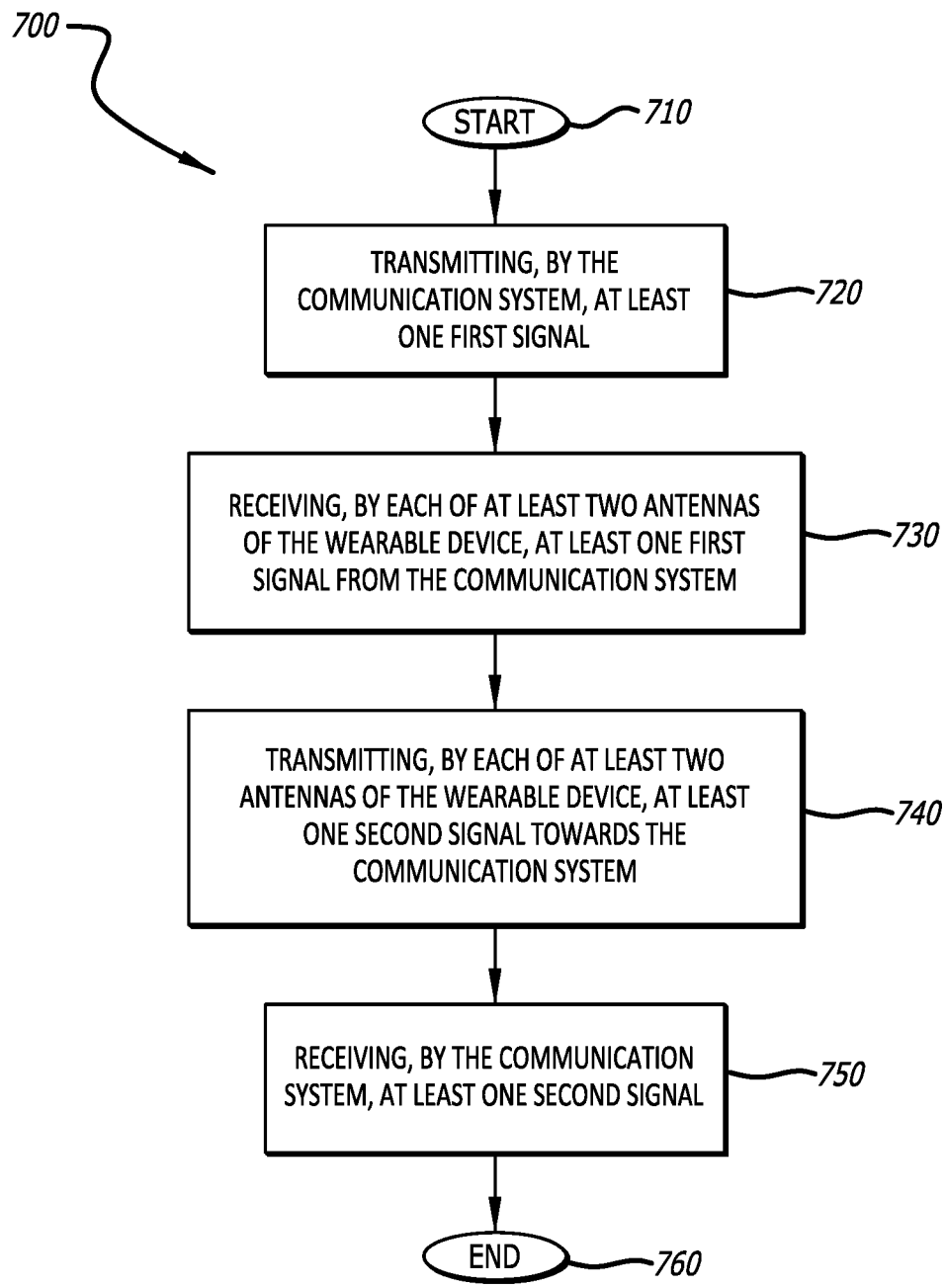
FIG. 7 is a diagram showing a flow chart for the disclosed method for a wearable device to make a link with a communication system, in accordance with at least one embodiment of the present disclosure.

FIG. 7 is a diagram showing a flow chart for the disclosed method 700 for a wearable device to make a link with a communication system, in accordance with at least one embodiment of the present disclosure. At the start 710 of the method 700, the communication system transmits at least one first signal 710. In one or more embodiments, each of at least two antennas of the wearable device is adaptively excited to steer in a direction towards the communication system and/or to steer in a direction to null at least one interferer. Then, each of at least two antennas of the wearable device receive at least one first signal from the communication system 730. Each of at least two antennas of the wearable device transmit at least one second signal towards the communication system 740. Then, the communication system receives at least one second signal 750. Then, the method 700 ends 760.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

As a further example, embodiments may involve an application or algorithm (e.g., a beam forming program(s)), which may be run on a processor(s) (e.g., processor 610). The application or algorithm may be a stand alone application, which may contain one or more programs, or that is part of another system or program.

Although particular embodiments have been shown and described, it should be understood that the above discussion is not intended to limit the scope of these embodiments. While embodiments and variations of the many aspects of the present disclosure have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for a wearable device to make a link with a communication system, the method comprising:
   transmitting, by the communication system, at least one first signal; and
   receiving, by each of at least two antennas of the wearable device, the at least one first signal from the communication system,
   wherein the wearable device comprises two wrist bands, and wherein each of the wrist bands comprises at least one of the at least two antennas,
   wherein each of the at least two antennas is adaptively excited via differential inputs to adaptively beam form the at least two antennas in the two wrist bands to at least one of: steer in a direction towards the communication system or steer in a direction to null at least one interferer.

2. The method of claim 1, wherein the method further comprises:
   transmitting, by each of the at least two antennas of the wearable device, at least one second signal towards the communication system; and
   receiving, by the communication system, the at least one second signal.

3. The method of claim 1, wherein the communication system comprises at least one of: at least one vehicle or at least one cellular tower.

4. The method of claim 3, wherein the at least one vehicle is at least one of: at least one satellite, at least one an airborne vehicle, at least one terrestrial vehicle, or at least one marine vehicle.

5. The method of claim 1, wherein the at least one of the at least two antennas is embedded within each of the wrist bands.

6. The method of claim 1, wherein at least one ground plane is embedded within each of the wrist bands.

7. The method of claim 1, wherein the at least two antennas are radio frequency (RF) antennas.

8. The method of claim 1, wherein the wearable device comprises at least one display.

9. The method of claim 8, wherein the at least one display displays at least one of: text or images.

10. The method of claim 1, wherein the wearable device comprises at least of: at least one speaker or at least one microphone.

11. The method of claim 1, wherein at least one of the at least two antennas is a planar log periodic antenna.

12. A system for a wearable device to make a link with a communication system, the system comprising:
   the communication system to transmit at least one first signal; and
   each of at least two antennas of the wearable device to receive the at least one first signal from the communication system,
   wherein the wearable device comprises two wrist bands, and wherein each of the wrist bands comprises at least one of the at least two antennas,
   wherein each of the at least two antennas is adaptively excited via differential inputs to adaptively beam form the at least two antennas in the two wrist bands to at least one of: steer in a direction towards the communication system or steer in a direction to null at least one interferer.

13. The system of claim 12, wherein each of the at least two antennas of the wearable device is further to transmit at least one second signal towards the communication system; and
   the communication system is further to receive the at least one second signal.

14. The system of claim 12, wherein the communication system comprises at least one of: at least one vehicle or at least one cellular tower.

15. The system of claim 14, wherein the at least one vehicle is at least one of: at least one satellite, at least one an airborne vehicle, at least one terrestrial vehicle, or at least one marine vehicle.

16. A wearable device to make a link with a communication system, the wearable device comprising:
   at least two antennas,
   wherein each of the at least two antennas is to receive at least one first signal from the communication system,
   wherein the wearable device comprises two wrist bands, and wherein each of the wrist bands comprises at least one of the at least two antennas,
   wherein each of the at least two antennas is adaptively excited via differential inputs to adaptively beam form the at least two antennas in the two wrist bands to at least one of: steer in a direction towards the communication system or steer in a direction to null at least one interferer, and
   wherein each of the at least two antennas is further to transmit at least one second signal towards the communication system.

17. The system of claim 16, wherein the communication system comprises at least one of: at least one vehicle or at least one cellular tower.

18. The system of claim 17, wherein the at least one vehicle is at least one of: at least one satellite, at least one an airborne vehicle, at least one terrestrial vehicle, or at least one marine vehicle.

19. The method of claim 6, wherein at least one of the at least two antennas is mounted on top of at least one of the at least one ground plane.

* * * * *